US012632465B2

(12) United States Patent
Dinsdale et al.

(10) Patent No.: US 12,632,465 B2
(45) Date of Patent: May 19, 2026

(54) SYSTEMS AND METHODS FOR SPORTS ABILITY RATINGS

(71) Applicant: STATS LLC, Chicago, IL (US)

(72) Inventors: Daniel Richard Dinsdale, London (GB); Nils MacKay, Amsterdam (NL); Hayley Redgate, Sandhurst (GB); Daniele Foroni, Rovereto (IT)

(73) Assignee: STATS LLC, Chicago, IL (US)

( * ) Notice: Subject to any disclaimer, the term of this patent is extended or adjusted under 35 U.S.C. 154(b) by 0 days.

(21) Appl. No.: 18/933,061

(22) Filed: Oct. 31, 2024

(65) Prior Publication Data

US 2025/0139121 A1     May 1, 2025

Related U.S. Application Data

(60) Provisional application No. 63/595,036, filed on Nov. 1, 2023.

(51) Int. Cl.
G06F 9/451 (2018.01)
A63B 24/00 (2006.01)
(Continued)

(52) U.S. Cl.
CPC .......... G06F 16/26 (2019.01); A63B 24/0021 (2013.01); G06F 9/451 (2018.02);
(Continued)

(58) Field of Classification Search
None
See application file for complete search history.

(56) References Cited

U.S. PATENT DOCUMENTS 8,738,722 B1 *  5/2014  Gass ................... G06Q 30/0203
                                                          709/204
9,101,841 B1 *  8/2015  Knapp .................... A63F 13/65
                    (Continued)

FOREIGN PATENT DOCUMENTS

WO       2023097387 A1     6/2023

OTHER PUBLICATIONS

Aydemir Ayse Elvan et al: "A Dimension Reduction Approach to Player Rankings in European Football", IEEE Access, IEEE, USA, vol. 9, Aug. 24, 2021 (Aug. 24, 2021), pp. 119503-119519, XP011876470.

(Continued)

*Primary Examiner* — Debbie M Le
(74) *Attorney, Agent, or Firm* — Bookoff McAndrews, PLLC

(57)          ABSTRACT

A method of generating a dynamic rating for an entity and rearranging an icon associated with the entity on a graphical user interface (GUI) of a computer system. The method includes: receiving a first set of data associated with one or more parameters for the entity; calculating a plurality of ability scores based on the first set of data; generating a first rating based on each ability score of the plurality of ability scores; dynamically adjusting the plurality of ability scores based on receiving a second set of data associated with the one or more parameters for the entity; updating the first rating based on the adjusted plurality of ability scores; automatically rearranging the icon to a position above or below a current position of the icon on the GUI based on the updated first rating.

20 Claims, 9 Drawing Sheets

=  +  +  +      600

FINAL          WITHIN-        LEAGUE              COUNTRY              CONTINENT
ELO            LEAGUE         ABILITY SCORE       ABILITY SCORE        ABILITY
POINTS         ABILITY                                                 SCORE
               SCORE

(51) Int. Cl.
    *G06F 16/26*       (2019.01)
    *G06T 11/60*       (2026.01)

(52) U.S. Cl.
    CPC ....... *G06T 11/60* (2013.01); *A63B 2024/0056*
            (2013.01); *G06T 2200/24* (2013.01)

(56) References Cited

U.S. PATENT DOCUMENTS

| | | | |
|---|---|---|---|
| 9,138,652 B1 * | 9/2015 | Thompson | H04N 21/237 |
| 11,465,057 B1 * | 10/2022 | Orlow | G07F 17/3225 |
| 11,816,597 B2 * | 11/2023 | Fowler | G06F 16/23 |
| 12,340,350 B2 * | 6/2025 | Fowler | G06Q 10/105 |
| 2006/0183548 A1 * | 8/2006 | Morris | G07F 17/32 |
| | | | 463/42 |
| 2009/0156311 A1 * | 6/2009 | Ng | A63F 13/12 |
| | | | 463/42 |
| 2013/0045806 A1 * | 2/2013 | Bloodworth | H04W 4/185 |
| | | | 463/43 |
| 2015/0065214 A1 | 3/2015 | Olson et al. | |
| 2017/0236237 A1 * | 8/2017 | Smuts | G07F 17/3272 |
| | | | 700/92 |
| 2019/0228290 A1 * | 7/2019 | Ruiz | G06N 5/01 |
| 2024/0350890 A1 * | 10/2024 | Wei | A63B 71/0616 |

OTHER PUBLICATIONS

International Search Report of International Application No. PCT/US2024/053817, dated Dec. 13, 2024, 10 pages.

\* cited by examiner

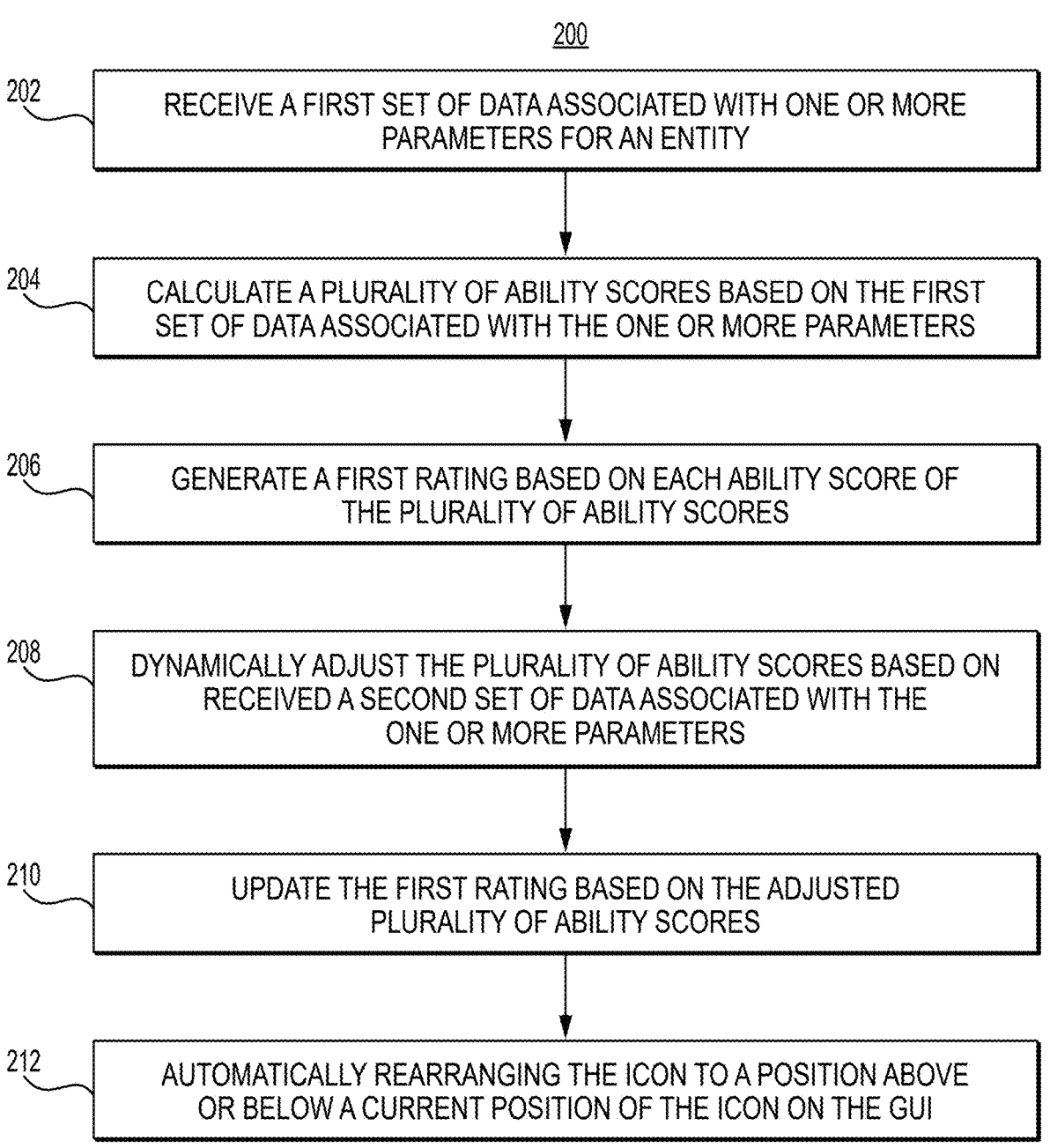

200

202 — RECEIVE A FIRST SET OF DATA ASSOCIATED WITH ONE OR MORE PARAMETERS FOR AN ENTITY

204 — CALCULATE A PLURALITY OF ABILITY SCORES BASED ON THE FIRST SET OF DATA ASSOCIATED WITH THE ONE OR MORE PARAMETERS

206 — GENERATE A FIRST RATING BASED ON EACH ABILITY SCORE OF THE PLURALITY OF ABILITY SCORES

208 — DYNAMICALLY ADJUST THE PLURALITY OF ABILITY SCORES BASED ON RECEIVED A SECOND SET OF DATA ASSOCIATED WITH THE ONE OR MORE PARAMETERS

210 — UPDATE THE FIRST RATING BASED ON THE ADJUSTED PLURALITY OF ABILITY SCORES

212 — AUTOMATICALLY REARRANGING THE ICON TO A POSITION ABOVE OR BELOW A CURRENT POSITION OF THE ICON ON THE GUI

*FIG. 2*

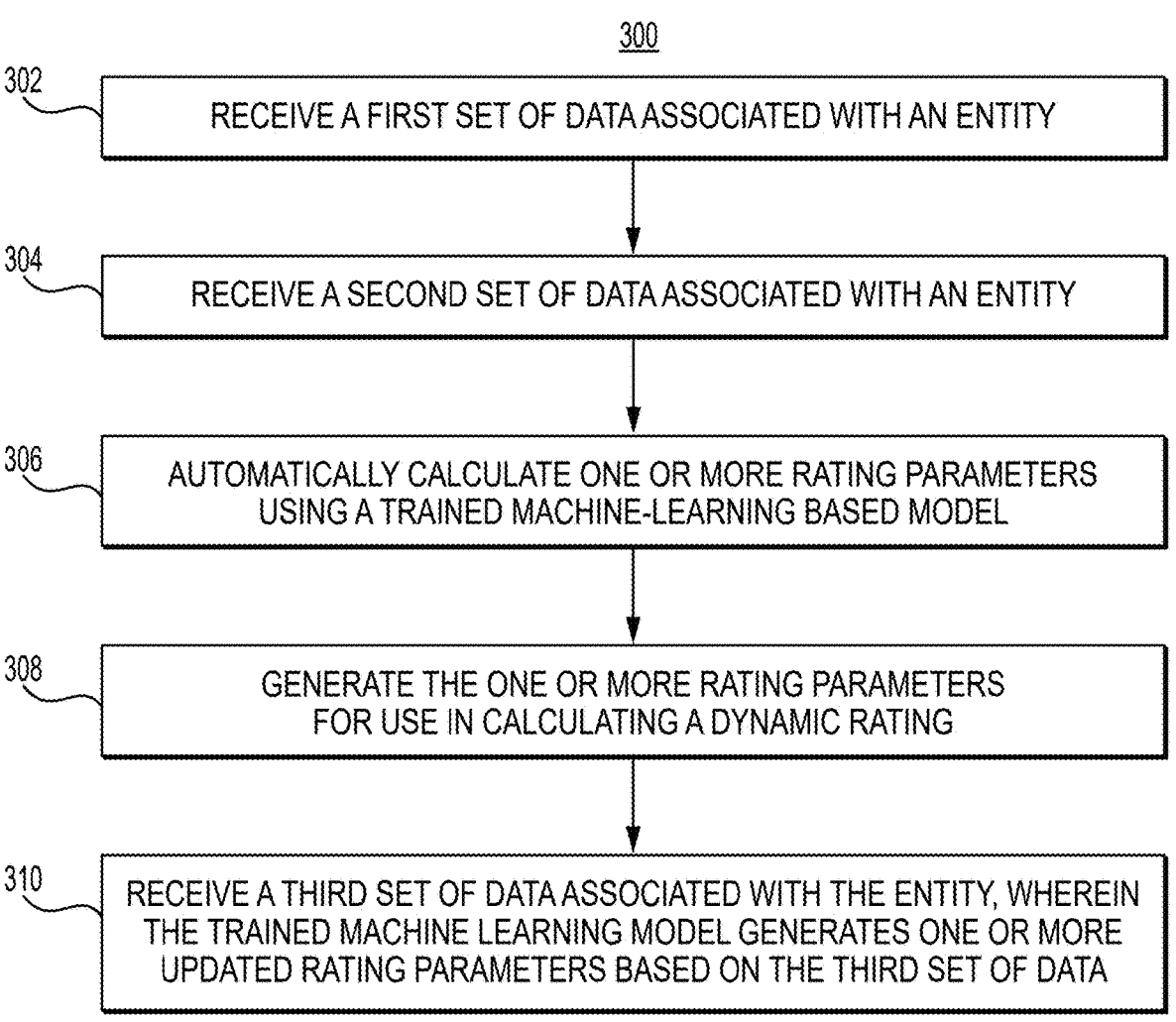

300

302 RECEIVE A FIRST SET OF DATA ASSOCIATED WITH AN ENTITY

304 RECEIVE A SECOND SET OF DATA ASSOCIATED WITH AN ENTITY

306 AUTOMATICALLY CALCULATE ONE OR MORE RATING PARAMETERS USING A TRAINED MACHINE-LEARNING BASED MODEL

308 GENERATE THE ONE OR MORE RATING PARAMETERS FOR USE IN CALCULATING A DYNAMIC RATING

310 RECEIVE A THIRD SET OF DATA ASSOCIATED WITH THE ENTITY, WHEREIN THE TRAINED MACHINE LEARNING MODEL GENERATES ONE OR MORE UPDATED RATING PARAMETERS BASED ON THE THIRD SET OF DATA

*FIG. 3*

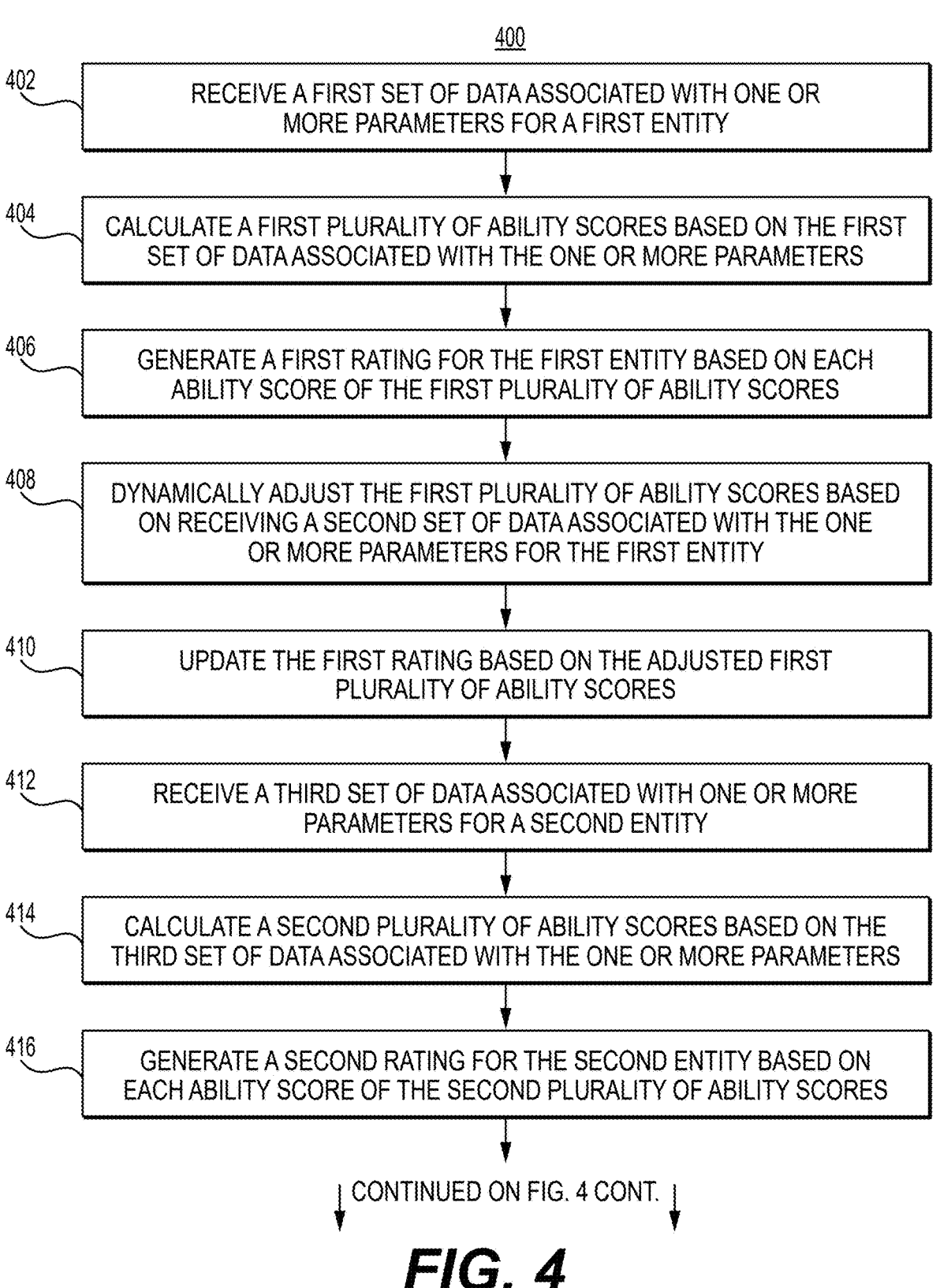

400

402 — RECEIVE A FIRST SET OF DATA ASSOCIATED WITH ONE OR MORE PARAMETERS FOR A FIRST ENTITY

404 — CALCULATE A FIRST PLURALITY OF ABILITY SCORES BASED ON THE FIRST SET OF DATA ASSOCIATED WITH THE ONE OR MORE PARAMETERS

406 — GENERATE A FIRST RATING FOR THE FIRST ENTITY BASED ON EACH ABILITY SCORE OF THE FIRST PLURALITY OF ABILITY SCORES

408 — DYNAMICALLY ADJUST THE FIRST PLURALITY OF ABILITY SCORES BASED ON RECEIVING A SECOND SET OF DATA ASSOCIATED WITH THE ONE OR MORE PARAMETERS FOR THE FIRST ENTITY

410 — UPDATE THE FIRST RATING BASED ON THE ADJUSTED FIRST PLURALITY OF ABILITY SCORES

412 — RECEIVE A THIRD SET OF DATA ASSOCIATED WITH ONE OR MORE PARAMETERS FOR A SECOND ENTITY

414 — CALCULATE A SECOND PLURALITY OF ABILITY SCORES BASED ON THE THIRD SET OF DATA ASSOCIATED WITH THE ONE OR MORE PARAMETERS

416 — GENERATE A SECOND RATING FOR THE SECOND ENTITY BASED ON EACH ABILITY SCORE OF THE SECOND PLURALITY OF ABILITY SCORES

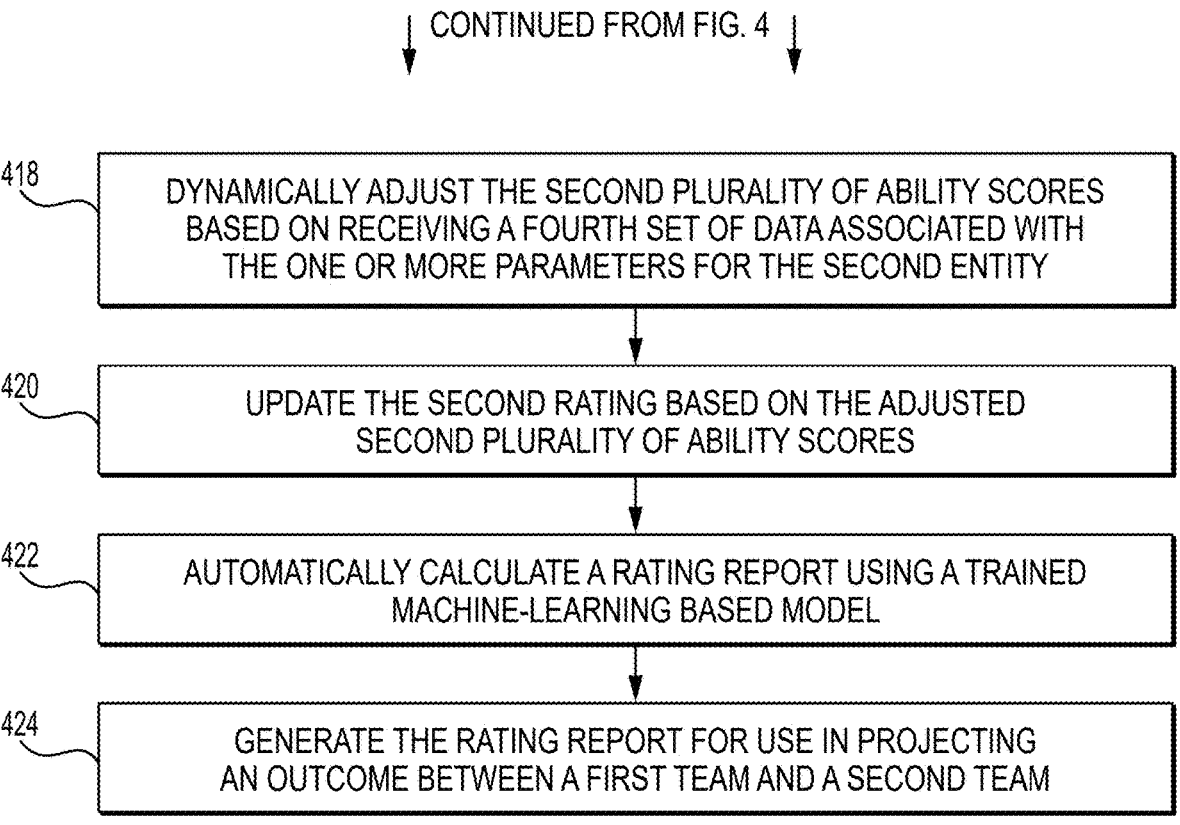

CONTINUED FROM FIG. 4

418 — DYNAMICALLY ADJUST THE SECOND PLURALITY OF ABILITY SCORES BASED ON RECEIVING A FOURTH SET OF DATA ASSOCIATED WITH THE ONE OR MORE PARAMETERS FOR THE SECOND ENTITY

420 — UPDATE THE SECOND RATING BASED ON THE ADJUSTED SECOND PLURALITY OF ABILITY SCORES

422 — AUTOMATICALLY CALCULATE A RATING REPORT USING A TRAINED MACHINE-LEARNING BASED MODEL

424 — GENERATE THE RATING REPORT FOR USE IN PROJECTING AN OUTCOME BETWEEN A FIRST TEAM AND A SECOND TEAM

| RANK | | | RATING |
|---|---|---|---|
| 1 | | BAYREN MÜNCHEN | GERMAN BUNDESLIGA | 100.00 |
| 2 | | MANCHESTER CITY | ENGLISH PREMIER LEAGUE | 98.32 |
| 3 | | LIVERPOOL | ENGLISH PREMIER LEAGUE | 95.65 |
| 4 | | REAL MADRID | SPANISH LA LIGA | 95.13 |
| 5 | | NAPOLI | ITALIAN SERIE A | 94.80 |
| 6 | | ARSENAL | ENGLISH PREMIER LEAGUE | 94.74 |
| 7 | | BARCELONA | SPANISH LA LIGA | 94.22 |
| 8 | | PSG | FRENCH LIGUE 1 | 94.11 |
| 9 | | INTERNAZIONALE | ITALIAN SERIE A | 92.40 |
| 10 | | RB LEIPZIG | GERMAN BUNDESLIGA | 92.13 |

SYSTEMS AND METHODS FOR SPORTS ABILITY RATINGS

CROSS-REFERENCE TO RELATED APPLICATIONS

This application claims priority under 35 U.S.C. § 119(e) to Provisional U.S. Patent Application No. 63/595,036, filed Nov. 1, 2023, the disclosure of which is hereby incorporated by reference in its entirety.

TECHNICAL FIELD

Various embodiments of the present disclosure relate generally to methods and systems for rating abilities of sports teams.

INTRODUCTION

Assigning a measure of ability to sports teams, for example, soccer teams across the globe, is a vital ingredient for accurate predictions across the sport. From predicting a win probability of a match to predicting a number of shots that a player is expected to make, knowing the ability of the teams involved in a game is helpful. To leverage these models over a large scale in the ever-growing landscape of the sport, it is helpful that these team ability ratings are rolled out at a huge scale across both the men's and the women's games.

Deploying ratings at scale can be a challenging task. For example, a majority of soccer matches are between teams within the same domestic league. This makes judging team quality within a league relatively simple. However, due to a lack of matches outside of domestic leagues, comparison of team quality from different leagues, countries and in particular continents, can be more challenging. This difficulty is exacerbated in women's soccer, where there is a wider range of team ability and even fewer matches between teams from different leagues, countries, and continents.

The present disclosure is directed to overcoming one or more of these above-referenced challenges. The introduction description provided herein is for the purpose of generally presenting the context of the disclosure.

SUMMARY

In some embodiments, a method is disclosed herein. The method generates a dynamic rating for an entity and rearranges an icon associated with the entity on a graphical user interface (GUI) of a computer system. The computer system receives, via one or more data sources, a first set of data associated with one or more parameters for the entity. The computer system calculates, via a deterministic algorithm, a plurality of ability scores based on the first set of data associated with the one or more parameters. The computer system generates, via the deterministic algorithm, a first rating based on each ability score of the plurality of ability scores. The computer system dynamically adjusts, via the deterministic algorithm, the plurality of ability scores based on receiving a second set of data associated with the one or more parameters for the entity. The computer system updates, via the deterministic algorithm, the first rating based on the adjusted plurality of ability scores. The computer system automatically rearranges the icon to a position above or below a current position of the icon on the GUI based on the updated first rating.

In some embodiments, a method is disclosed herein. The method generates a dynamic rating for an entity. A computer system receives, via one or more data sources, a first set of data associated with an entity. The computer system receives, via the one or more data sources, a second set of data associated with the entity. The computer system automatically calculates one or more rating parameters by inputting the first set of data and the second set of data into a trained machine-learning based model, wherein: the trained machine-learning based model is trained to learn associations between the first set of data and the second set of data, each of the first set of data and the second set of data associated with (i) one or more scores of a sports match or (ii) one or more game reports of a sports match; the trained machine-learning model is configured, via the training, to generate, as output, the one or more rating parameters for use in calculating the dynamic rating for the entity, based on the learned associations. The computer system receives, via the one or more data sources, a third set of data associated with the entity, wherein the trained machine-learning model generates one or more updated rating parameters based on the third set of data for use in updating the dynamic rating for the entity.

In some embodiments, a method is disclosed herein. The method generates a rating report for display on a graphical user interface (GUI) on a downstream entity. The computer system receives, via one or more data sources, a first set of data associated with one or more parameters for a first entity. The computer system calculates, via a deterministic algorithm, a first plurality of ability scores based on the first set of data associated with the one or more parameters. The computer system generates, via the deterministic algorithm, a first rating for the first entity based on the first plurality of ability scores. The computer system dynamically adjusts, via the deterministic algorithm, the first plurality of ability scores based on receiving a second set of data associated with the one or more parameters for the first entity. The computer system updates, via the deterministic algorithm, the first rating based on the adjusted first plurality of ability scores. The computer system receives, via the one or more data sources, a third set of data associated with one or more parameters for a second entity. The computer system calculates, via the deterministic algorithm, a second plurality of ability scores based on the third set of data associated with the one or more parameters. The computer system generates, via the deterministic algorithm, a second rating for the second entity based on the second plurality of ability scores. The computer system dynamically adjusts, via the deterministic algorithm, the second plurality of ability scores based on receiving a fourth set of data associated with the one or more parameters for the second entity. The computer system updates, via the deterministic algorithm, the second rating based on the adjusted second plurality of ability scores. The computer system automatically calculates the rating report by inputting the first rating and the second rating into a trained machine-learning based model, wherein: the trained machine-learning based model is trained to learn associations between the first rating and the second rating, the first rating associated with a rating for a first sports team and the second rating associated with a rating for a second sports team; and the trained machine-learning model is configured, via the training, to generate, as output, the rating report for use in projecting an outcome between the first sports team and the second sports team, based on the learned associations, wherein the rating report is displayed on the GUI of the downstream entity.

BRIEF DESCRIPTION OF THE DRAWINGS

The accompanying drawings, which are incorporated in and constitute a part of this specification, illustrate various exemplary embodiments and together with the description, serve to explain the principles of the disclosed aspects.

FIG. 2 depicts an exemplary flow diagram for generating a dynamic rating, in accordance with an aspect of the disclosed subject matter.

FIG. 3 depicts another exemplary flow diagram for generating an updated dynamic rating, in accordance with an aspect of the disclosed subject matter.

FIG. 4 depicts another exemplary flow diagram for generating a rating report, in accordance with an aspect of the disclosed subject matter.

Figure 1:
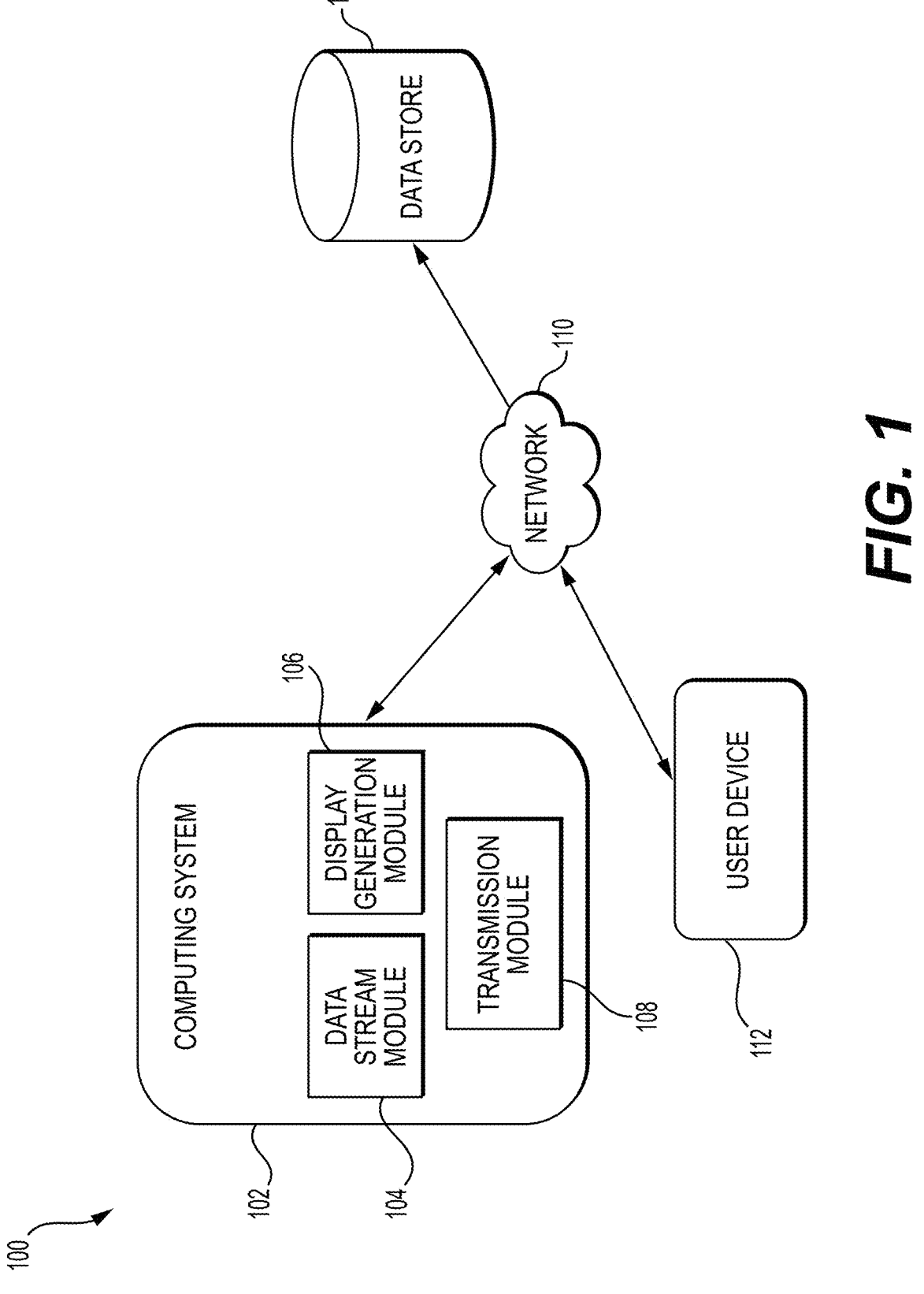
FIG. 1 depicts an exemplary environment for using a machine-learning model to generate a dynamic rating, in accordance with an aspect of the disclosed subject matter.

Notably, for simplicity and clarity of illustration, certain aspects of the figures depict the general configuration of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments.

DETAILED DESCRIPTION OF EMBODIMENTS

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only.

Various embodiments of the present disclosure relate generally to rating abilities of players and teams in sports. As discussed above, existing systems suffer from deficiencies. For example, none of the existing approaches apply the rating system at anywhere near the same scale as those described herein, or across men's and/or women's soccer, for example. In the context of soccer in particular, the rating system disclosed herein may be built worldwide across both men's (13,000+ teams across 183 different countries and 413 leagues) and women's (2,000+ teams across 68 different countries and 140 leagues).

While soccer is used as an example, disclosed techniques are equally applicable to other team sports such as football, basketball, cricket, rugby, baseball, and so forth.

Disclosed techniques can employ algorithmic and/or machine-learning approaches.

Technical advantages of the disclosed techniques include improvements to rating reports for sports matches. For instance, certain aspects relate to determining representative parameters and ratings from a multitude of data sources in order to improve the performance, accuracy, and results of information to be mapped to play graphics. In doing so, disclosed techniques provide improvements relative to existing solutions. The techniques disclosed herein improve rating reports for sports matches by, for example, generating as well as dynamically adjusting and refining ratings for a sports team based on one or more of player performance data, match reports, and/or designated parameters in a hierarchical structure. By employing such a process that dynamically adjust and refines ratings for a sports team in a hierarchical structure, the scope and breadth of the number of sports teams that can be rated is vastly improved and the data considered in generating and adjusting ratings for a sports team, thereby resulting in more accurate rating reports for sports matches as well as the ability to more accurately predict the result of a sports match. Accordingly, the techniques disclosed herein apply technological solutions for generating team ratings using a hierarchical structure in an efficient and scalable manner that would not otherwise be possible without such technical solutions.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as generative learning, linear regression, logistic regression, random forest, gradient boosted machine (GBM), deep learning, graphical neural network (GNN), and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine learning, it should be understood that techniques according to this disclosure may be adapted to any suitable type of machine learning. It should also be understood that the examples above are illustrative only. The techniques and technologies of this disclosure may be adapted to any suitable activity.

Compared to the prior art, disclosed techniques herein offer advantages such as (1) being able to analyze as many sports teams as possible and (2) being able to provide ratings for both men's and women's sports teams.

Disclosed systems rely on a team ability ratings system which is flexible enough to provide ratings to any sports team and enable comparison of sports teams within the same sport from any league in the world. For example, both men's soccer (13,000+ teams across 183 different countries and 413 leagues) and/or women's soccer (2,000+ teams across 68 different countries and 140 leagues) teams may be rated and although their rating systems are run separately, the same or similar algorithm may be used for both.

To cover as many teams as possible, an ability rating system is built using match final score data. Many leagues do not have detailed in-game information; hence the rating system may not rely upon detailed in-game match data needed to obtain the desired breadth of coverage in the rating system.

The rating system may ensure that the system is built in a way that there is no need to change the framework for men's and women's soccer. The ratings of men's teams may not be compared with those of women's teams, as the systems may be separate. However, the rating systems may use similar methods and/or may learn from each other.

Disclosed systems can adapt quickly across all teams worldwide. The rating system enables rating change to quickly propagate between leagues and across continents. Certain leagues have very little cross-pollination with other leagues, countries, and continents, and thus a need exists to be able to compare sports teams worldwide using a fair easily digestible system. Additionally, as teams move between leagues, the rating system may adjust their rating going into their new season accordingly.

As an example, an Elo rating system may be used. Elo ratings may be a rating system used, for example, in sports such as chess. This system updates ability ratings after each match by comparing a pre-game expected result based on the pre-game ratings of each player/team, and the actual result of that match. If a player/team performs worse than the expected result, then the player/team loses rating (e.g., is associated with a relatively worse rating).

The better a team is, the easier it is for them to lose rating through poor results, since their pre-game win expectancy will usually be high. Elo may be a zero-sum system. In other words, whichever one team in the match gain or lose in Elo rating, the other team may have an opposite change in Elo rating. For example, one team loses 20 rating points, then the other team will then gain 20 rating points.

Ensuring that the rating system is flexible across a huge pool of teams worldwide, in which very few teams from different leagues, countries and continents that will ever play each other to provide with reliable comparative information. To solve this issue, a hierarchical ability rating system may be used, which assign ability scores to each continent, country, league, and team. To obtain a final ability score, these four ratings are summed together. Although four ratings are provided as an example, it will be understood that any applicable number of ratings may be applied. For example, take Arsenal Football Club in the top tier of England (Premier League). Their ability rating will be a sum of four separate ability ratings for their continent, country, league, and within-league ability.

The within-league team level of the hierarchy has its Elo rating adjusted for every game. However, the league, country and continent levels may be adjusted when a game takes place between teams in different elements of that hierarchy. Only the highest level of the hierarchy may be affected. The following are examples of the Elo rating adjustment.

Example 1

Manchester United Women vs Manchester City Women in the English Women's Super League. In this case, both team's within-league ratings may be updated without updating any other hierarchy value as they are all the same (same league, country and continent for both teams).

Example 2

Manchester City (English Premier League) vs York City (English National League North) in the FA Cup. In this case, both team's within-league rating scores may be updated but along with adjusting their league ratings (Premier League and Nation League North).

Example 3

Manchester United vs Manchester City (both English Premier League teams) playing in the FA Cup. In this case, both team's within-league ratings may be updated but without updating any other hierarchy value since they are still from the same league even though they are playing in a different competition.

Example 4

Manchester City Women (English Women's Super League) vs FC Barcelona Femeni (Spanish Women's Primera Division) in the UEFA Women's Champions League. In this case, both team's within-league rating and both England's and Spain's ratings may be updated. The league rating may not be updated since only the highest level of the hierarchy affected may be altered (apart from within-league rating which is always updated).

Example 5

Manchester City (English Premier League) vs Vasco da Gama (Campeonato Brasileiro Série A) in the FIFA Club World Cup. We update both team's within-league rating along with the European and South American continent ratings. We do not alter the league or country ratings as we only adjust the highest level of the hierarchy affected (apart from within-league rating which is always updated).

When an update is applied to more than just the within-league team rating, a proportion of the rating change from the match to the higher-level hierarchy may be applied. In the final example above, say the Elo rating change from the final result is +50 for Manchester City, then a percentage of that 50 rating points may go to Manchester City's within-league team score, and the remaining to the European continent rating (and taken away from the South American continent rating). This percentage is a model parameter and can be changed for league, country, and continents. 100% of the rating change from a within-league match may go to the teams.

When teams move leagues, there is a need to ensure that their new pre-season rating makes sense within the context of their new league. Typically, when teams move league, their ability will change quite drastically due to either getting more money through promotion, or less money through relegation. In addition, some leagues can be easier to move between than others, so there needs a model that is general enough to provide a reasonable approximation to the initial performance of a team when moving leagues.

To do this, a league change adjustment calculation may be added to the method. An example is provided for exemplary purposes. For example, teams moving into and out of the English Championship—the 2nd tier of the English football system. The adjustment calculation is based on percentiles of the within-league ratings from the league that the team that is being adjusted is moving into. Recall that the final team rating includes the league rating which will consequently change for teams moving leagues. Therefore, what will need adjustment is the within-league ability score.

For example, three teams are promoted from the Championship (tier 2—England) into the Premier League (tier 1—England) for the 2021/2022 season. The newly promoted teams are assumed to be relatively weak in the new league. Hence, their within-league ratings is adjusted based on a low percentile of Premier League within-league team ratings from the 2020/2021 season. The percentile is a model parameter that can be adjusted for each league based on historical knowledge of how easy the transition has been for teams moving between these leagues in the past.

For promotion into the new league, all the newly promoted team's within-league ratings may be multiplied by a constant, which ensures that their new average within-league rating is equal to the low-percentile within-league rating of the league above (most commonly 25th percentile). For teams being relegated, it's the same approach except that the percentile value of previous season within-league rating is higher (most commonly 75th percentile). Hence, it may be ensured that the relegated teams new within-league ratings are on average a high percentile in the new league (e.g., will be on average a high ability team in the new league).

The advantage of this approach is that previous season performance in the newly adjusted ratings (e.g. champions of a league should have a better ratings than the other promoted teams) are accounted for, but also centering the ability of new teams on a likely performance level, which may be optimized in model training.

In some examples, not all games are of equal importance. For instance, playing in the Community Shield is less important than the Champions League final. Hence, there needs to be accounting for this in how certain games impact the potential change of ability rating for teams, leagues, countries, and continents.

To do this, a match importance factor may be included in the rating method, which adjusts the "importance value" within the Elo calculation. This value controls how much rating is available to trade in a match, with a higher importance meaning a team can gain or lose more rating, and a lower importance meaning you cannot gain or lose as much. For example, the importance may be adjusted in two ways:

Competition-based match importance. This is based on the type of competition that the match is being played in. For example, domestic leagues and between-country competitions are typically more important than domestic cup competitions.

Game week-based match importance. The game week is which game of the season that this is for each team. In this case, more importance is assigned to the first 9 game weeks within domestic leagues. Although these games might not be more important for the teams involved, they are more important for the method to learn changing team performance based on pre-season expectations. This could be due to new players and is particularly important for teams which have just moved league and have gone through the promotion/relegation rating adjustment.

Disclosed techniques can scale the final rating scores of each team to make a digestible number for public use. For example, in the case of a Power Ranking system, the final rating score of each team may be taken and then both power and min/max scaler transformers may be utilized to create a 0-100 rating score for each team, where the best team in the world on any given day is scored 100 (and the worst 0).

As discussed herein, one or more machine learning models may be trained to understand a sports language. Accordingly, machine learning models disclosed herein are sports machine learning models. Such sports machine learning models may be trained using sports related data (e.g., tracking data, event data, etc., as discussed herein). A sports machine learning model trained to understand a sports language based on sports related data may be trained to adjust one or more weights, layers, nodes, biases, and/or synapses based on the sports related data. A sports machine learning model may include components (e.g., a weights, layers, nodes, biases, and/or synapses) that collectively associate one or more of: a player with a team or league; a team with a player or league; a score with a team; a scoring event with a player; a sports event with a player or team; a win with a player or team; a loss with a player or team; and/or the like. A sports machine learning model may correlate sports information and statistics in a competition landscape. A sports machine learning model may be trained to adjust one or more weights, layers, nodes, biases, and/or synapses to associate certain sports statistics in view of a competition landscape. For example, a win indicator for a given team may automatically correlated with a loss indicator for an opposing team. As another example, a score static may be considered a positive attribution for a scoring team and a negative attribution for a team being scored upon. As another example, a given score may be ranked against one or more scores based on a relative position of the score in comparison to the one or more other scores.

A sports machine learning model may be trained based on sports tracking and/or event data, as discussed herein. Such data may include player and/or object position information, movement information, trends, and changes. For example, a sports machine learning model may be trained by modifying one or more weights, layers, nodes, biases, and/or synapses to associate given positions in reference to the playing surface of venue and/or in reference to one or more agents. As another example, a sports machine learning model may be trained by modifying one or more weights, layers, nodes, biases, and/or synapses to associate given movement or trends in reference to the playing surface of venue and/or in reference to none or more agents. As another example, a sports machine learning model may be trained by modifying one or more weights, layers, nodes, biases, and/or synapses to associate sporting events with corresponding time boundaries, teams, players, coaches, officials, and environmental data associated with a location of corresponding sporting events.

A sports machine learning model may be trained by modifying one or more weights, layers, nodes, biases, and/or synapses to associate position, movement, and/or trend information in view of a sports target. A sports target may be a score related target (e.g., a score, a goal, a shot, a shot count, a point, etc.), a play outcome (e.g., a pass, a movement of an object such as a ball, player positions, etc.), a player position, and/or the like. A sports machine learning model may be trained in view sports targets, play outcomes, player positions, and/or the like associated with a given sport (e.g., soccer, American football, basketball, baseball, tennis, golf, rugby, hockey, a team sport, an individual sport, etc.). For example, a football based sports machine learning model may be trained to correlate or otherwise associate player position information in reference to a football field. The football based sports machine learning model may further be trained to correlate or otherwise associate sports data in reference to a number of players and sports targets specific to football.

According to aspects, one or more given sports machine learning model types (e.g., generative learning, linear regression, logistic regression, random forest, gradient boosted machine (GBM), deep learning, graph neural networks (GNN) and/or a deep neural network) may be determined based on attributes of a given sport for which the one or more machine learning models are applied. The attributes may include, for example, sport type (e.g., individual sport vs. team sport), sport boundaries (e.g., time factors, player number factors, object factors, possession periods (e.g., overlapping or distinct), playing surface type (e.g., restricted, unrestricted, virtual, real, etc.) player positions, etc.

According to aspects, a sports machine learning model may receive inputs including sports data for a given sport and may generate a matrix representation based on features of the given sport. The sports machine learning model may be trained to determine potential features for the given sport. For example, the matrix may include fields and/or sub-fields related to player information, team information, object information, sports boundary information, sporting surface information, etc. Attributes related to each field or sub-field may be populated within the matrix, based on received or extracted data. The sports machine learning model may perform operations based on the generated matrix. The features may be updated based on input data or updated training data based on, for example, sports data associated with features that the model is not previously trained to associate with the given sport. Accordingly, sports machine learning models may be iteratively trained based on sports data or simulated data.

FIG. 1 depicts an exemplary environment 100 that may be utilized with techniques presented herein. One or more user device(s) 112 may communicate across an electronic network 110. The one or more user device(s) 112 may be associated with a user, e.g., a user that is viewing and/or interacting with a generated interactive display, an administrator of one or more components of environment 100, and/or the like. As will be discussed in further detail below, one or more computing system(s) 102 may communicate with one or more of the other components of the environment 100 across electronic network 110.

The user device(s) 112 may be configured to enable a user to access and/or interact with other systems in the environment 100. For example, the user device(s) 112 may each be a computer system such as, for example, a desktop computer, a mobile device, a tablet, etc. In some embodiments, the user device(s) 112 may include one or more electronic application(s), e.g., a program, plugin, browser extension, etc., installed on a memory of the user device(s) 112. In some embodiments, the electronic application(s) may be associated with one or more of the other components in the environment 100. For example, the electronic application(s) may include one or more of system control software, system monitoring software, software development tools, etc.

In various embodiments, the environment 100 may include a data store 114 (e.g., database). The data store 114 may include a server system and/or a data storage system such as computer-readable memory such as a hard drive, flash drive, disk, etc. In some embodiments, the data store 114 includes and/or interacts with an application programming interface for exchanging data to other systems, e.g., one or more of the other components of the environment. The data store 114 may include and/or act as a repository or source for storing event data, user data, a generated display, output data, and the like (e.g., to be transmitted to user device(s) 112 or any of the other components of environment 100).

In some embodiments, the components of the environment 100 are associated with a common entity, e.g., a service provider, an account provider, or the like. For example, in some embodiments, computing system 102 and data store 114 may be associated with a common entity. In some embodiments, one or more of the components of the environment is associated with a different entity than another. For example, computing system 102 may be associated with a first entity (e.g., a service provider) while data store 114 may be associated with a second entity (e.g., a storage entity providing storage services to the first entity). The systems and devices of the environment 100 may communicate in any arrangement.

As depicted in FIG. 1, computing system(s) 102 may include data stream module 104. In various embodiments, data stream module 104 is configured to receive a plurality of event data, match data, user data, content, advertisements, and/or live stream or streaming audio/video data. The data and other aspects may be gathered and/or compiled by the computing system 102 or using components separate from environment 100. In examples, match data and/or event data may include actions taken by a player(s) during a match/ game that inform the generated interactive display. In various implementations, the data may be received by the data stream module 104 almost simultaneous to an event action of a player occurring or, at least, substantially simultaneous to the event action taking place. The data may be received by computing system(s) 102 over electronic network 110.

According to certain embodiments, data stream module 104 may receive in-venue or broadcast data associated with a sporting event. Such in-venue or broadcast data may be used to generate the event data discussed herein. For example, such in-venue or broadcast data may be provided to one or more event machine learning models. The one or more event machine learning models may be trained based on training data that includes historical or simulated in-venue or broadcast data, historical or simulated event data (e.g., tagged data), historical or simulated event actions, and/or the like. The training data may be used to train the event machine learning models by modifying one or more weighs, layers, synapses, biases, and/or the like of the event machine learning models, in accordance with a machine learning algorithm, as discussed herein. Alternatively, or in addition, such in-venue or broadcast data may supplement received event data for verification and/or use to generate an interactive display.

Computing system(s) 102 may also include display generation module 106. In various embodiments, display generation module 106 may be configured to generate an interactive display using the data received by data stream module 104. In various embodiments, display generation module 106 may be configured to generate an interactive display. The interactive display may include at least one of a graphical representation of one or more of the aspects described herein. In various embodiments, the interactive display is generated in real-time as the data is received (e.g., by data stream module 104). Computing system(s) 102 may also include transmission module 108. In various embodiments, transmission module 108 may be configured to transmit to a user interface the interactive display.

As depicted in FIG. 1, environment 100 may also include electronic network 110. In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Although depicted as separate components in FIG. 1, it should be understood that a component or portion of a component in the environment 100 may, in some embodiments, be integrated with or incorporated into one or more other components. In another example, the computing system 102 may be integrated in a data storage system. The data storage system may be configured to communicate and/or receive/send data across electronic network 110 to other components of environment 100. In some embodiments, operations or aspects of one or more of the components discussed above may be distributed amongst one or more other components. Any suitable arrangement and/or integration of the various systems and devices of the environment 100 may be used.

The methods described herein may be performed on or between one or more computing devices. FIG. 2 depicts an example method 200 of generating a dynamic rating for a sports team. The method 200 may be used to generate the dynamic rating for a sports team to be output and for use by a user. For example, the sports team may be an English Premier League (EPL) team and the method 200 may generate an icon for display on a graphical user interface (GUI) including the dynamic rating for the EPL team relative to other EPL teams as well as other teams across the world. In some examples, the sports team may be an Esports team. For example, the sports team may be a League of Legends (LOL) team and the method 200 may generate an icon for display on the GUI including the dynamic rating for the LoL team relative to other LoL teams across the world. The techniques disclosed herein for physical sports may similarly applied to Esports teams (e.g., based on Esports team leagues, locations, hierarchy, etc.).

The method 200 includes a first step 202 where a first set of data may be received from the data store 114 and/or one or more data sources separate from the data store 114. The first set of data may be associated with one or more parameters related to generating the rating for the sports team. For example, the first set of data may include one or more of: a first match report, a first set of player data, a geographical location, and/or a first score report. In some examples, the first set of data may be gathered manually by one or more users. One or more users may review score reports including games between multiple teams. The score reports may include a final match score (e.g., the match finished 2-0 or 1-1). For example, the geographical location of the sports team may be Germany, England, France, USA, Colombia, Argentina, etc. The one or more parameters may include, for example, competition-based match importance weighting and/or game week-based match importance weighting. The one or more parameters controls the value in which a certain match affects the dynamic rating of the sports team.

At a second step 204, a plurality of ability scores may be calculated for the sports team based on the first set of data. For example, a first ability score and a second ability score of the plurality of ability scores may be generated based on the geographical location of the sports team. This first ability score may be a country ability score. The second ability score of the plurality of ability scores may be a continent ability score. A third ability score of the plurality of ability scores may be generated for a league associated with the sports team. This third ability score may be a league ability score. A fourth ability score of the plurality of ability scores may be generated within the league associated with the sports team. This fourth ability score may be a within-league ability score. While four ability scores are described of the plurality of ability scores, any desired number of ability scores may be used to generate a first rating for the sports team.

At a third step 206, the first rating may be generated as a sum or other applicable relationship of the plurality of ability scores. For example, the first rating may be generated by adding the country ability score, the within continent ability score, league ability score, and the within-league ability score. In an example, the first rating may be an Elo rating for the sports team. The first rating may be incorporated into a hierarchical rating system (shown in FIG. 5) and the first rating may be assigned a position within the hierarchical rating system.

At a fourth step 208, the plurality of ability scores may be dynamically adjusted upon receipt of a second set of data. The second set of data may be associated with the one or more parameters related to generating the rating for the sports team. For example, the second set of data may include one or more of: a second match report, a second set of player data, and/or a second score report. The second set of data may be used to update one or more of: the country ability score, the continent ability score, league ability score, and the within-league ability score. For example, the second score report associated with the sports team is received and the within-league ability score may be updated based on the second score report. As another example, the second score report associated with the sports team is received and the second score report details a match between the sports team associated with the league and a different sports team associated with a different league. In such an example, the within-league ability score and the league ability score may be updated. As yet another example, the second score report details a match between the sports team associated with the league and a different sports team associated with the same league, but in a separate competition than the league. In such an example, only the within-league ability score may be updated.

At a fifth step 210, the first rating is updated based on the dynamically adjusted plurality of ability scores. This first rating is updated via a deterministic algorithm. The deterministic algorithm may adjust the ability score based on the first set of data and the second set of data such that the first rating is updated relative to the hierarchical rating system. For example, at a sixth step 212, the first rating for the sports team may be represented by an icon in a graphical user interface (GUI) (shown in FIG. 7). As the first rating is updated via the deterministic algorithm, the icon positioning may be rearranged within the GUI. The rearranging of the icon within the GUI represents an improvement or worsening of a position of the sports team relative to other sports teams within the hierarchical rating system.

FIG. 3 depicts an example method 300 of generating a dynamic rating for a sports team. A trained rating machine-learning based model may generate a rating parameter. The rating parameter may be associated with the deterministic algorithm in order to updated the dynamic rating for the sports team. At step 302, a first set of data may be received from the data store 114 and/or one or more data sources separate from the data store 114. The first set of data may be associated with a first parameter related to generating the dynamic rating for the sports team. For example, the first set of data may include one or more of: a first match report, a first set of player data, and/or a first score report. In some examples, the first set of data may be gathered manually by one or more users. One or more users may review score reports including games between multiple teams. The score reports may include a final match score (e.g., the match finished 2-0 or 1-1). In an example, the geographical location of the sports team may be Germany, England, France, USA, Colombia, Argentina, etc. The first parameter may include, for example, one of a competition-based match importance weighting or a game week-based match importance weighting. The first parameter controls the value in which a certain match affects the dynamic rating of the sports team.

At step 304, a second set of data may be received from the data store 114 and/or one or more data sources separate from the data store 114. The second set of data may be associated with the first parameter related to generating the dynamic rating for the sports team. For example, the second set of data may include one or more of: a second match report, a second set of player data, and/or a second score report.

At step 306, a second parameter may be output by a machine learning model (e.g., a parameter machine learning model). The machine learning model may be trained using a training data set that includes historical or simulated characteristics associated with the first data set and the second data set, based on historical, simulated, or actual match reports (e.g., using tracking data and/or event data), based on historical or simulated score reports, and/or the like. The machine learning model may receive, as inputs, the first data set and the second data set. The score report may be provided as inputs to the machine learning model or may be otherwise accessible by the machine learning model. The machine learning model learns associations between the first data set and the second data set. Based on such input data and/or access, the machine learning model may output, at step 308, a rating parameter for use in calculating the dynamic rating for the sports team. For example, the machine learning model may generate and output an additional parameter that is based on one or more scores of a sports match between the two sports teams in the score report or one or more game reports of a sports match between the two sports teams in the match report. At step 310, the machine learning model may update the output rating parameter based on receiving a third set of data. The machine learning model may output an updated rating parameter for each new set of data that is received.

FIG. 4 depicts an example method 400 of generating a rating report for a sports team for display on a GUI. The method 400 may be used to generate the rating report for a sports team to be output and for use by a user. For example, the sports team may be an English Premier League (EPL) team and the method 400 may generate a rating report for display on the (GUI) including a predicted outcome for the EPL team relative to other EPL teams as well as other teams across the world.

The method 400 includes a first step 402 where a first set of data may be received from the data store 114 and/or one or more data sources separate from the data store 114. The first set of data may be associated with one or more parameters related to generating the rating for the sports team. For example, the first set of data may include one or more of: a first match report, a first set of player data, a geographical location, and/or a first score report. In some examples, the first set of data may be gathered manually by one or more users. One or more users may review score reports including games between multiple teams. The score reports may include a final match score (e.g., the match finished 2-0 or 1-1). For example, the geographical location of the sports team may be Germany, England, France, USA, Colombia, Argentina, etc. The one or more parameters may include, for example, competition-based match importance weighting and/or game week-based match importance weighting. The one or more parameters controls the value in which a certain match affects the dynamic rating of the sports team.

At a second step 404, a plurality of ability scores may be calculated for the sports team based on the first set of data. For example, a first ability score and a second ability score of the plurality of ability scores may be generated based on the geographical location of the sports team. This first ability score may be a country ability score. The second ability score of the plurality of ability scores may be a continent ability score. A third ability score of the plurality of ability scores may be generated for a league associated with the sports team. This third ability score may be a league ability score. A fourth ability score of the plurality of ability scores may be generated within the league associated with the sports team. This fourth ability score may be a within-league ability score. While four ability scores are described of the plurality of ability scores, any desired number of ability scores may be used to generate a first rating for the sports team.

At a third step 406, the first rating may be generated as a sum of the plurality of ability scores. For example, the first rating may be generated by adding the country ability score, the continent ability score, league ability score, and the within-league ability score. In an example, the first rating may be an Elo rating for the sports team. The first rating may be incorporated into a hierarchical rating system (shown in FIG. 5) and the first rating may be assigned a position within the hierarchical rating system.

At a fourth step 408, the plurality of ability scores may be dynamically adjusted upon receipt of a second set of data. The second set of data may be associated with the one or more parameters related to generating the rating for the sports team. For example, the second set of data may include one or more of: a second match report, a second set of player data, and/or a second score report. The second set of data may be used to update one or more of: the country ability score, the continent ability score, league ability score, and the within-league ability score. For example, the second score report associated with the sports team is received and the within-league ability score may be updated based on the second score report. As another example, the second score report associated with the sports team is received and the second score report details a match between the sports team associated with the league and a different sports team associated with a different league. In such an example, the within-league ability score and the league ability score may be updated. As yet another example, the second score report details a match between the sports team associated with the league and a different sports team associated with the same league, but in a separate competition than the league. In such an example, only the within-league ability score may be updated.

At a fifth step 410, the first rating is updated based on the dynamically adjusted plurality of ability scores. This first rating is updated via a deterministic algorithm. The deterministic algorithm may adjust the ability score based on the first set of data and the second set of data such that the first rating is updated relative to the hierarchical rating system.

At a sixth step 412, a third set of data may be received from the data store 114 and/or one or more data sources separate from the data store 114. The third set of data may be associated with one or more parameters related to generating the rating for a second sports team. For example, the third set of data may include one or more of: a third match report, a third set of player data, a third geographical location, and/or a third score report. In some examples, the third set of data may be gathered manually by one or more users. One or more users may review score reports including games between multiple teams. The score reports may include a final match score (e.g., the match finished 2-0 or 1-1). For example, the geographical location of the sports team may be Germany, England, France, USA, Colombia, Argentina, etc. The one or more parameters may include, for example, competition-based match importance weighting and/or game week-based match importance weighting. The one or more parameters controls the value in which a certain match affects the dynamic rating of the sports team.

At a seventh step 414, a second plurality of ability scores may be calculated for the second sports team based on the third set of data. At an eighth step 416, a second rating may be generated for the second sports term as a sum of the second plurality of ability scores. At a ninth step 418, the second plurality of ability scores may be dynamically adjusted upon receipt of a fourth set of data. The fourth set of data may be associated with the one or more parameters related to generating the second rating for the second sports team. For example, the fourth set of data may include one or more of: a fourth match report, a fourth set of player data, and/or a fourth score report. The fourth set of data may be used to update one or more of: the country ability score, continent ability score, league ability score, and the within-league ability score.

At a tenth step 420, the second rating may be updated based on the dynamically adjusted second plurality of ability scores. This second rating may be updated via the deterministic algorithm.

At an eleventh step 422, the rating report may be generated using a trained machine-learning based model. The rating report may be output by a machine learning model (e.g., a report machine learning model). The machine learning model may be trained using a training data set that includes historical or simulated characteristics associated with the first rating and the second rating, based on historical, simulated, or actual match reports (e.g., using tracking data and/or event data), based on historical or simulated score reports, and/or the like. The machine learning model may receive, as inputs, the first rating and the second rating. The machine learning model learns associations between the first rating and the second rating. The score reports may be provided as inputs to the machine learning model or may be otherwise accessible by the machine learning model. Based on such input data and/or access, the machine learning model may output, at step 424, a rating report for use in projecting an outcome between the sports team and the second sports team. For example, the machine learning model may generate and output, to a downstream entity, a predicted outcome that is based on the first rating and the second rating between the two sports teams. The machine learning model may output an updated rating report for each instance the first rating and the second rating are adjusted.

Figures 5, 6:
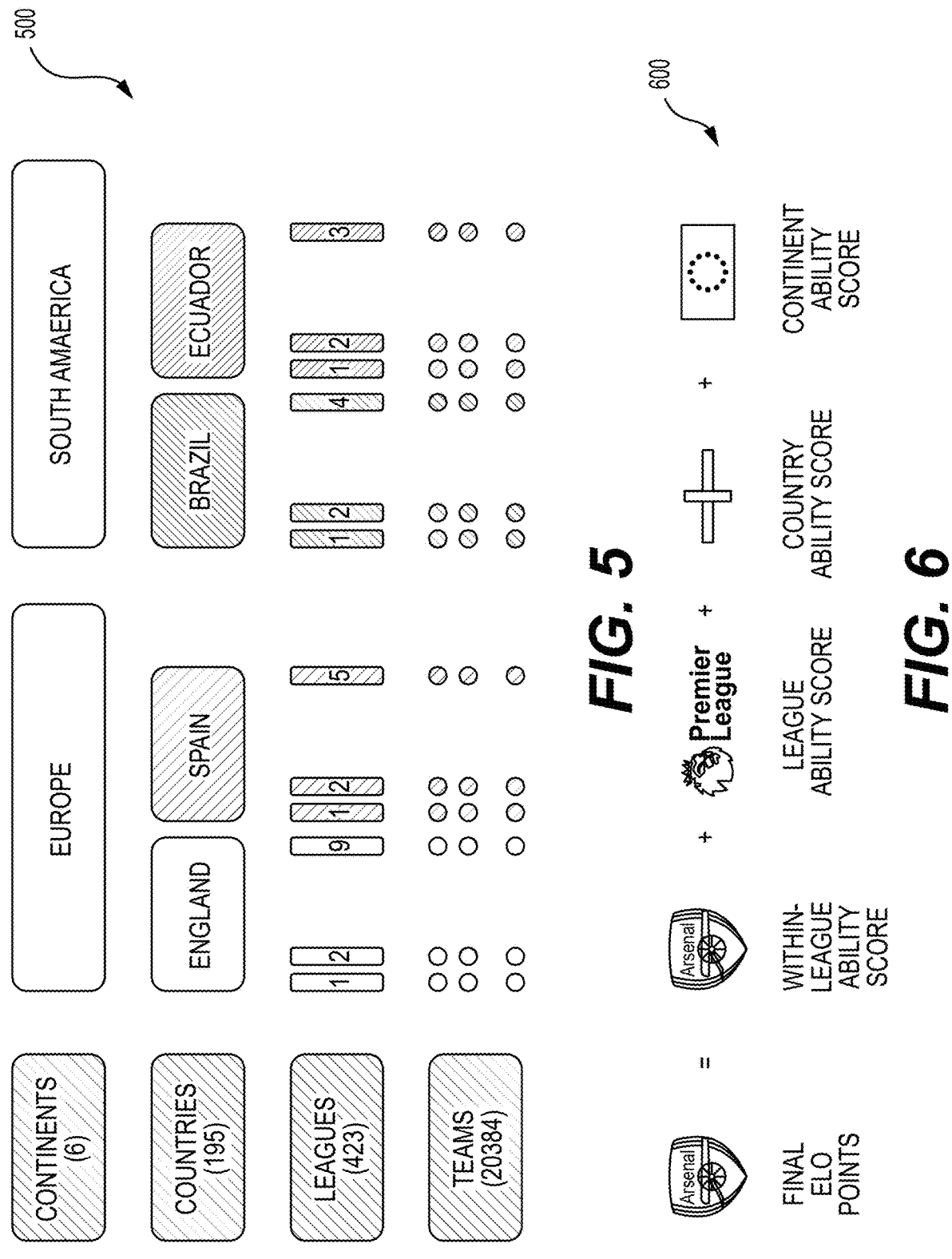
FIG. 5 depicts an exemplary graphical user interface for displaying a hierarchical rating system, in accordance with an aspect of the disclosed subject matter.
FIG. 6 depicts a simplified calculation for a dynamic rating, in accordance with an aspect of the disclosed subject matter.

FIG. 5 depicts an example GUI interface representing the hierarchical rating system. The sports team may be positioned within the GUI to illustrate a rating of the sports team associated with each of the plurality of ability scores. For example, a plurality of sports teams are arranged based on their rating to illustrate relative strength or weakness as compared to other sports teams of the plurality of sports teams.

FIG. 6 depicts a simplified calculation of the rating performed by the deterministic algorithm.

Figure 7:
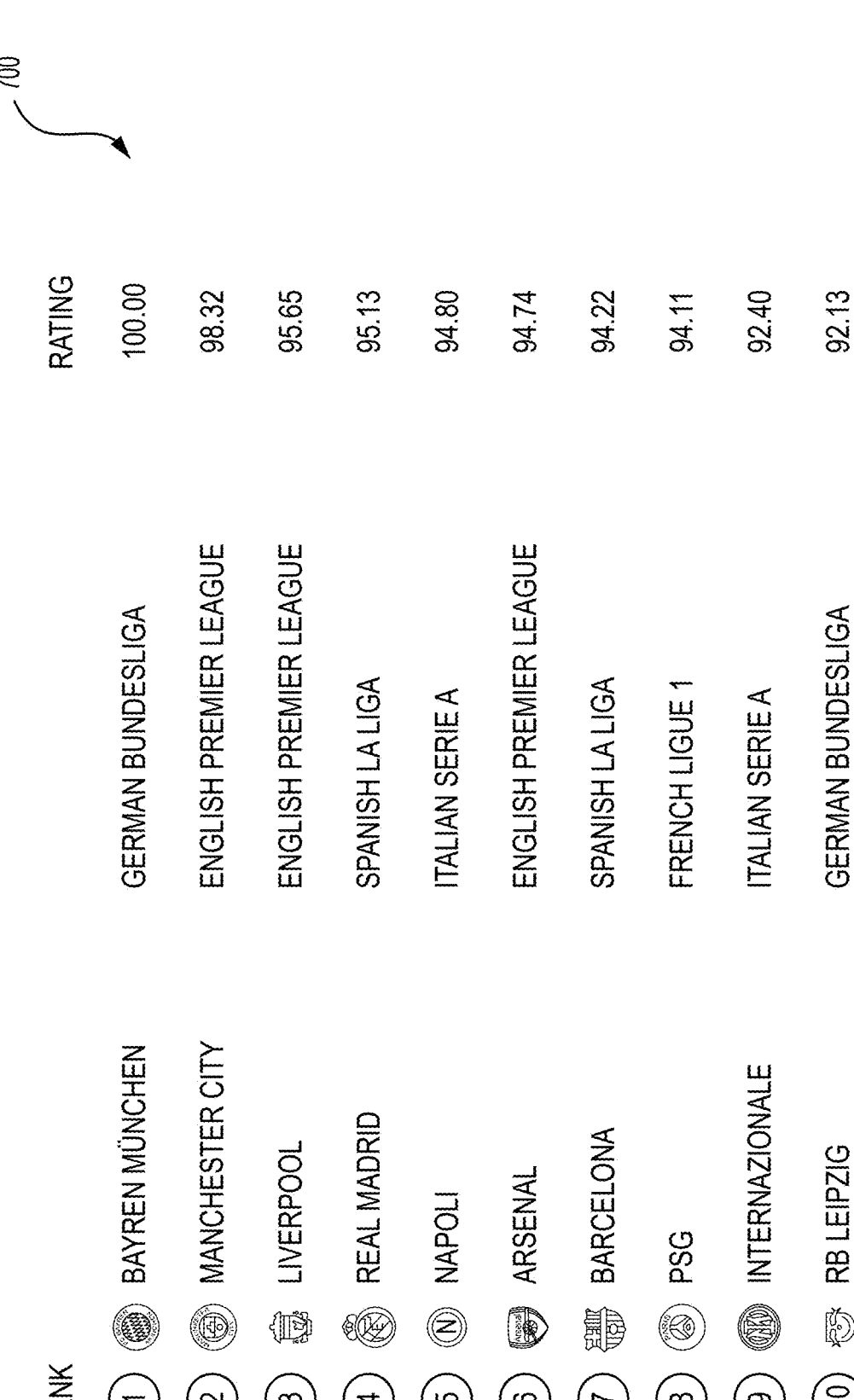
FIG. 7 depicts an exemplary graphical user interface for displaying a hierarchical rating system

FIG. 7 depicts an example GUI interface representing the hierarchical rating system. The sports team may be positioned within the GUI to illustrate a rating of the sports team associated with each of the plurality of ability scores. For example, a plurality of sports teams are arranged based on their rating to illustrate relative strength or weakness as compared to other sports teams of the plurality of sports teams.

Figure 8:
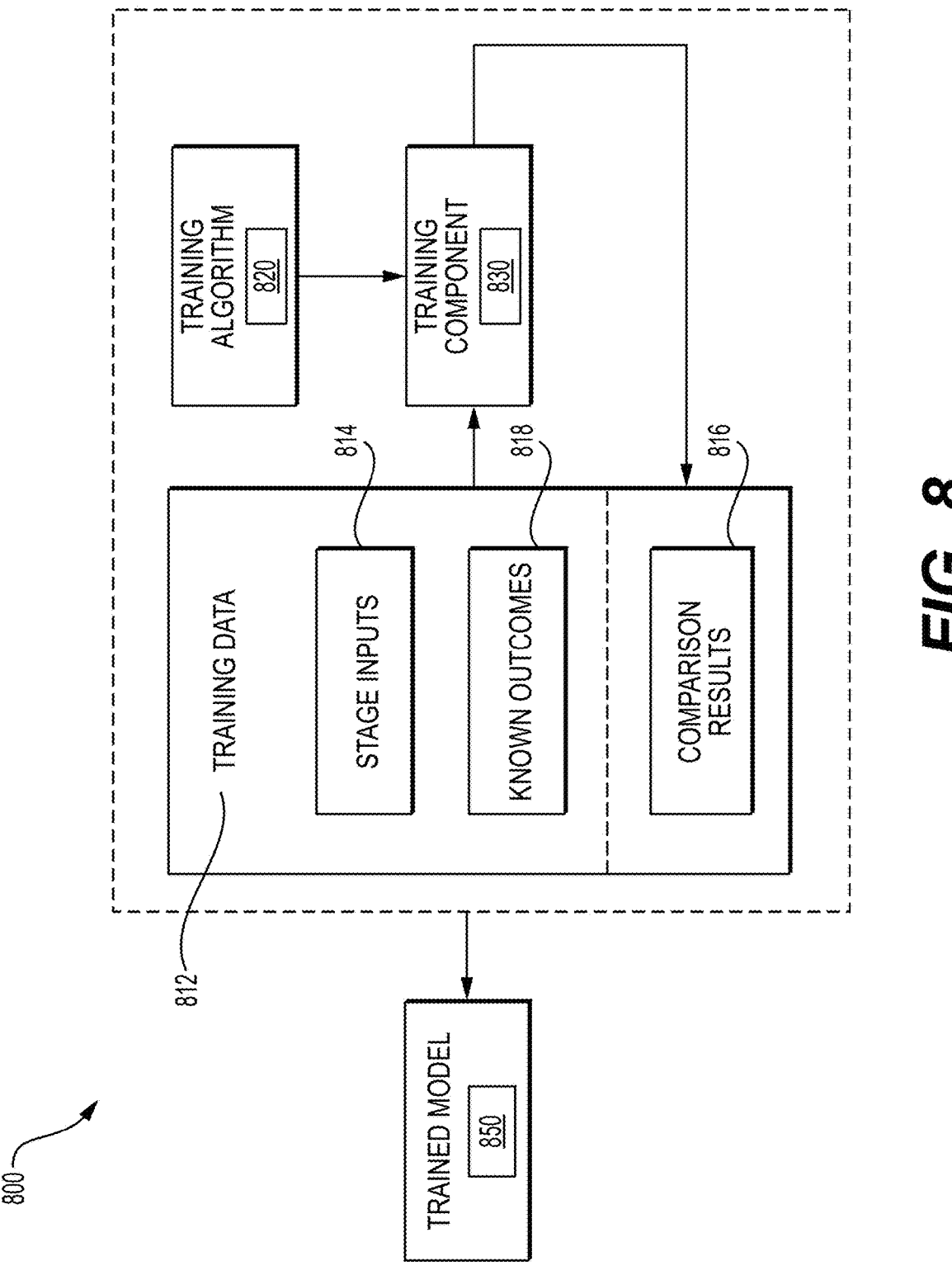
FIG. 8 depicts a flow diagram for training a machine-learning model, in accordance with an aspect of the disclosed subject matter.

FIG. 8 depicts a flow diagram for training a machine learning model, in accordance with an aspect of the disclosed subject matter. As shown in flow diagram 800 of FIG. 8, training data 812 may include one or more of stage inputs 814 and known outcomes 818 related to a machine learning model to be trained. The stage inputs 814 may be from any applicable source including a component or set shown in the figures provided herein. The known outcomes 818 may be included for machine learning models generated based on supervised or semi-supervised training. An unsupervised machine learning model might not be trained using known outcomes 818. Known outcomes 818 may include known or desired outputs for future inputs similar to or in the same category as stage inputs 814 that do not have corresponding known outputs.

The training data 812 and a training algorithm 820 may be provided to a training component 830 that may apply the training data 812 to the training algorithm 820 to generate a trained machine learning model 850. According to an implementation, the training component 830 may be provided comparison results 816 that compare a previous output of the corresponding machine learning model to apply the previous result to re-train the machine learning model. The comparison results 816 may be used by the training component 830 to update the corresponding machine learning model. The training algorithm 820 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 800 may be a trained machine learning model 850.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

It should be understood that aspects in this disclosure are exemplary only, and that other aspects may include various combinations of features from other aspects, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 9:
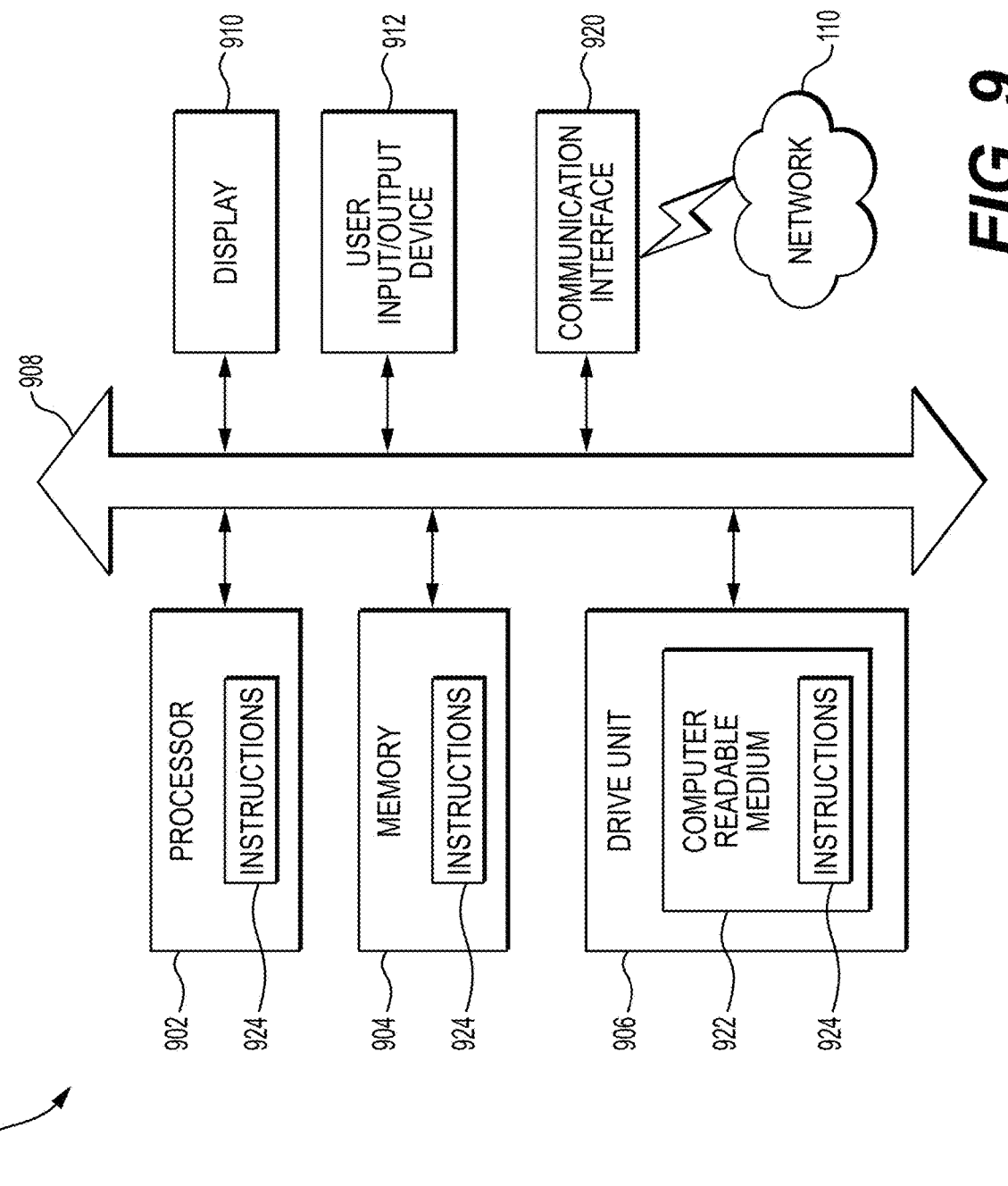
FIG. 9 depicts an example computing device, according to one or more embodiments.

FIG. 9 is a simplified functional block diagram of a computer 900 that may be configured as a device for executing the methods disclosed here, according to exemplary aspects of the present disclosure. For example, the computer 900 may be configured as a system according to exemplary aspects of this disclosure. In various aspects, any of the systems herein may be a computer 900 including, for example, a data communication interface 920 for packet data communication. The computer 900 also may include a central processing unit ("CPU") 902, in the form of one or more processors, for executing program instructions. The computer 900 may include an internal communication bus 908, and a storage unit 906 (such as ROM, HDD, SDD, etc.) that may store data on a computer readable medium 922, although the computer 900 may receive programming and data via network communications.

The computer 900 may also have a memory 904 (such as RAM) storing instructions 924 for executing techniques presented herein, for example the methods described with respect to FIGS. 2-4, although the instructions 924 may be stored temporarily or permanently within other modules of computer 900 (e.g., processor 902 and/or computer readable medium 922). The computer 900 also may include input and output ports 912 and/or a display 910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed aspects may be applicable to any environment, such as a desktop or laptop computer, an automobile entertainment system, a home entertainment system, etc. Also, the disclosed aspects may be applicable to any type of Internet protocol.

It should be appreciated that in the above description of exemplary aspects of the invention, various features of the invention are sometimes grouped together in a single aspect, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed aspect. Thus, the claims following the Detailed Description are hereby expressly incorporated into this Detailed Description, with each claim standing on its own as a separate aspect of this invention.

Furthermore, while some aspects described herein include some but not other features included in other aspects, combinations of features of different aspects are meant to be within the scope of the invention, and form different aspects, as would be understood by those skilled in the art. For example, in the following claims, any of the claimed aspects can be used in any combination.

Thus, while certain aspects have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Operations may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

We claim:

1. A method of generating a dynamic rating for an entity and rearranging an icon associated with the entity on a graphical user interface (GUI) of a computer system, the method comprising:

receiving, via one or more data sources, a first set of data associated with one or more parameters for the entity, wherein the entity is a sports team;

calculating, via a deterministic algorithm, a plurality of ability scores based on the first set of data associated with the one or more parameters;

generating, via the deterministic algorithm, a first rating based on each ability score of the plurality of ability scores;

dynamically adjusting, via the deterministic algorithm, the plurality of ability scores based on receiving a second set of data associated with the one or more parameters for the entity;

updating, via the deterministic algorithm, the first rating based on the adjusted plurality of ability scores; and automatically rearranging the icon to a position above or below a current position of the icon on the GUI based on the updated first rating.

2. The method of claim 1, wherein the one or more parameters controls a value in which a single point of data within the first set of data affects the dynamic rating.

3. The method of claim 1, wherein the one or more parameters includes a competition-based match importance weighting and/or a game week-based match importance weighting.

4. The method of claim 1, wherein the first set of data includes one or more of: a first match report, a first set of player data, a geographical location, and/or a first score report.

5. The method of claim 1, wherein the plurality of ability scores includes a first ability score, a second ability score, a third ability score, and a fourth ability score, wherein each of the first ability score, the second ability score, the third ability score, and the fourth ability score are different from one another.

6. The method of claim 5, wherein the first ability score is an ability score associated with a country.

7. The method of claim 5, wherein the second ability score is an ability score associated with a continent.

8. The method of claim 5, wherein the third ability score is an ability score associated with a league associated with the entity.

9. The method of claim 5, wherein the fourth ability score is an ability score associated with the entity within a league.

10. The method of claim 1, wherein the GUI is represented as a hierarchical rating system in which the icon for the entity represents a sports team.

11. The method of claim 1, wherein each of the ability scores of the plurality of ability scores is based on a likelihood of a performance level for one or more of a geographic location, a sporting event location, a sporting team location, or a sports league.

12. The method of claim 1, wherein rearranging the icon includes rearranging the icon according to a numeric value of the updated first rating.

13. A method of generating a dynamic rating for an entity, the method comprising:

receiving, via one or more data sources, a first set of data associated with the entity, wherein the entity is a sports team;

receiving, via the one or more data sources, a second set of data associated with the entity;

automatically calculating one or more rating parameters by inputting the first set of data and the second set of data into a trained machine-learning based model, wherein:

the trained machine-learning based model is trained to learn associations between the first set of data and the second set of data, each of the first set of data and the second set of data associated with (i) one or more scores of a sports match or (ii) one or more game reports of a sports match;

the trained machine-learning model is configured, via the training, to generate, as output, the one or more rating parameters for use in calculating the dynamic rating for the entity, based on the learned associations; and receiving, via the one or more data sources, a third set of data associated with the entity, wherein the trained machine-learning model generates one or more updated rating parameters based on the third set of data for use in updating the dynamic rating for the entity.

14. The method of claim 13, wherein the first set of data includes one or more of: a first match report, a first set of player data, a first geographical location, and/or a first score report.

15. The method of claim 14, wherein the second set of data includes one or more of: a second match report, a second set of player data, a second geographical location, and/or a second score report.

16. The method of claim 13, wherein the one or more rating parameters includes a competition-based match importance weighting and/or a game week-based match importance weighting.

17. The method of claim 13, wherein the updated rating parameters are used as inputs in a deterministic algorithm.

18. A method of generating a rating report for display on a graphical user interface (GUI) on a downstream entity, the method comprising:

receiving, via one or more data sources, a first set of data associated with one or more parameters for a first entity;

calculating, via a deterministic algorithm, a first plurality of ability scores based on the first set of data associated with the one or more parameters;

generating, via the deterministic algorithm, a first rating for the first entity based on the first plurality of ability scores;

dynamically adjusting, via the deterministic algorithm, the first plurality of ability scores based on receiving a second set of data associated with the one or more parameters for the first entity;

updating, via the deterministic algorithm, the first rating based on the adjusted first plurality of ability scores;

receiving, via the one or more data sources, a third set of data associated with one or more parameters for a second entity;

calculating, via the deterministic algorithm, a second plurality of ability scores based on the third set of data associated with the one or more parameters;

generating, via the deterministic algorithm, a second rating for the second entity based on the second plurality of ability scores;

dynamically adjusting, via the deterministic algorithm, the second plurality of ability scores based on receiving a fourth set of data associated with the one or more parameters for the second entity;

updating, via the deterministic algorithm, the second rating based on the adjusted second plurality of ability scores;

automatically calculating the rating report by inputting the first rating and the second rating into a trained machine-learning based model, wherein:

the trained machine-learning based model is trained to learn associations between the first rating and the second rating, the first rating associated with a rating for a first sports team and the second rating associated with a rating for a second sports team; and the trained machine-learning model is configured, via the training, to generate, as output, the rating report for use in projecting an outcome between the first sports team and the second sports team, based on the learned associations, wherein the rating report is displayed on the GUI of the downstream entity.

19. The method of claim 18, wherein the first set of data includes one or more of: a first match report, a first set of player data, a first geographical location, and/or a first score report, and wherein the second set of data includes one or more of: a second match report, a second set of player data, a second geographical location, and/or a second score report.

20. The method of claim 18, wherein the machine-learning model outputs an updated rating report for each instance the first rating and the second rating are updated.

* * * * *